United States Patent [19]
Hsu

[11] Patent Number: 5,986,722
[45] Date of Patent: Nov. 16, 1999

[54] COVER FOR COVERING A RECESSED PORTION OF A CASE

[75] Inventor: Hung-Huan Hsu, Taipei, Taiwan

[73] Assignee: Acer Peripherals, Inc., Taiwan

[21] Appl. No.: 08/960,229

[22] Filed: Oct. 29, 1997

[30] Foreign Application Priority Data

Aug. 28, 1997 [TW] Taiwan ................................ 086214731

[51] Int. Cl.⁶ ...................................................... H04N 5/64
[52] U.S. Cl. ................... 348/836; 348/843; 292/DIG. 38
[58] Field of Search ............................. 312/7.2; 348/839, 348/843, 836; 292/DIG. 38, 203

[56] References Cited

U.S. PATENT DOCUMENTS

| | | | |
|---|---|---|---|
| 3,744,864 | 7/1973 | Schmitz | 312/7.2 X |
| 3,794,399 | 2/1974 | Conner et al. | 312/7.2 X |
| 3,850,464 | 11/1974 | Bisbing et al. | 292/DIG. 38 X |
| 3,985,380 | 10/1976 | Raivio | 292/DIG. 38 X |
| 4,145,096 | 3/1979 | Sitsen et al. | 312/7.2 |
| 4,270,668 | 6/1981 | Berfield | 292/DIG. 38 X |
| 4,436,201 | 3/1984 | Inaba | 292/DIG. 38 X |
| 4,470,624 | 9/1984 | Bisbing | 292/DIG. 38 X |
| 4,974,740 | 12/1990 | Niles et al. | 292/DIG. 38 X |
| 4,985,962 | 1/1991 | Weber | 292/DIG. 38 X |
| 5,076,461 | 12/1991 | Nichols | 292/DIG. 38 X |
| 5,358,291 | 10/1994 | Malmanger et al. | 292/DIG. 38 X |
| 5,623,391 | 4/1997 | Chase et al. | 312/7.2 X |
| 5,737,039 | 4/1998 | Lopez et al. | 348/836 |

FOREIGN PATENT DOCUMENTS 383359   7/1932   United Kingdom ........... 292/DIG. 38

*Primary Examiner*—Peter M. Cuomo
*Assistant Examiner*—David E. Allred
*Attorney, Agent, or Firm*—Pillsbury Madison & Sutro LLP

[57] ABSTRACT

A cover for covering a recessed portion of the case of a computer monitor. The cover includes a cover strip, a first engaging protrusion and a second engaging protrusion. The first engaging protrusion and the second engaging protrusion can be engaged with a first aperture and a second aperture formed in the recessed portion.

7 Claims, 6 Drawing Sheets

COVER FOR COVERING A RECESSED PORTION OF A CASE

BACKGROUND OF THE INVENTION

1. Field of the Invention

The invention relates to a cover for covering a recessed portion of a case. In particular, it relates to a cover for covering a recessed portion in which a screw is used for mounting the case onto the front panel of a monitor. The cover can be easily mounted onto and detached from the case of the monitor.

2. Description of the Related Art

Referring to FIG. 1a, which is a perspective view of a conventional monitor, as a heavy cathode-ray tube (not shown) is received in the monitor, two screws 5, 5 are used to firmly mount the case 2 of the monitor onto the front panel (bezel) 1. This design precludes the surface of the monitor from being smooth.

Referring to FIG. 1b, recently monitors have been designed to have the screws 5, 5 being hidden in two longitudinal recessed portions 4, 4 formed in the case 2. And then two cover strips (not shown) are used to cover the two longitudinal recessed portions 4, 4 to make the profile of the assembled monitor appear smooth. However, according to a conventional design, the cover strips can not be detached from the case easily. A tool such as a screwdriver must be used to detach the cover strips from the case 2. Thus, the conventional design is not convenient and the tool may scratch the surface of the case 2.

SUMMARY OF THE INVENTION

It is therefore an object of the invention to provide a cover for covering a recessed portion which is formed in a case and has a first aperture and a second aperture, to eliminate the above disadvantages.

The cover of the invention includes a cover plate for covering the recessed portion. The cover plate has a first end and a second end. A first engaging protrusion for engaging with the first aperture, is disposed in proximity to the first end, wherein a pressing-down section is formed between the first engaging protrusion and the first end. A second engaging protrusion for engaging the second aperture, is disposed in proximity to the second end wherein a bouncing-up section is formed between the first engaging means and the second engaging means and is made of a resilient material.

According to an aspect of the invention, the cover plate covers the recessed portion of the case so that the case profile appears smooth.

According to another aspect of the cover of the invention, simply pressing down on the pressing-down section can disengage the second engaging protrusion from the second aperture and then to disengage the first engaging protrusion from the first aperture so that detaching the cover from the case requires no additional tools.

BRIEF DESCRIPTION OF THE DRAWINGS

The present invention can be fully understood by reading the subsequent detailed description and the preferred embodiment with references made to the accompanying drawings, wherein.

DETAILED DESCRIPTION OF THE PREFERRED EMBODIMENT

Figure 1B:
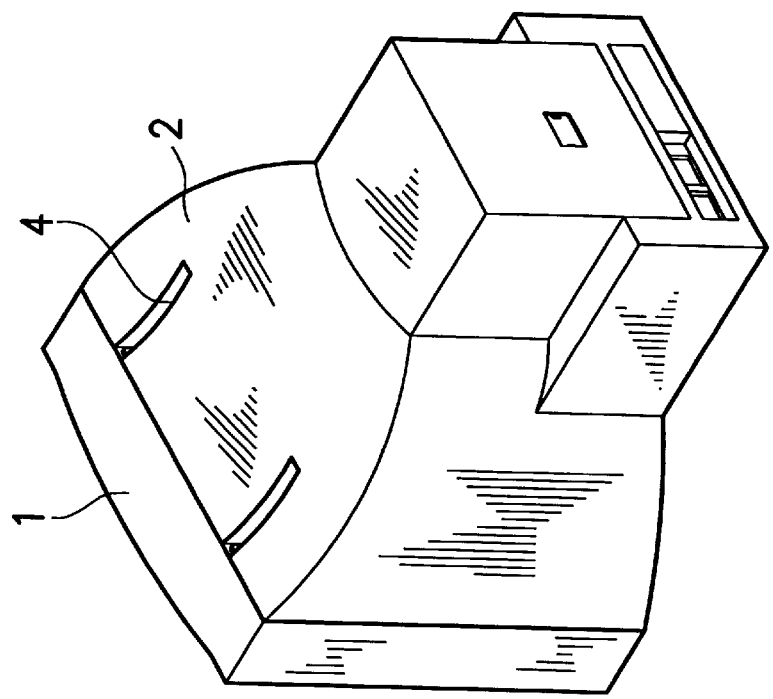
FIG. 1b is a perspective view of a conventional computer monitor wherein two longitudinal recessed portions are formed on the case to hide the screws.
Figure 1A:
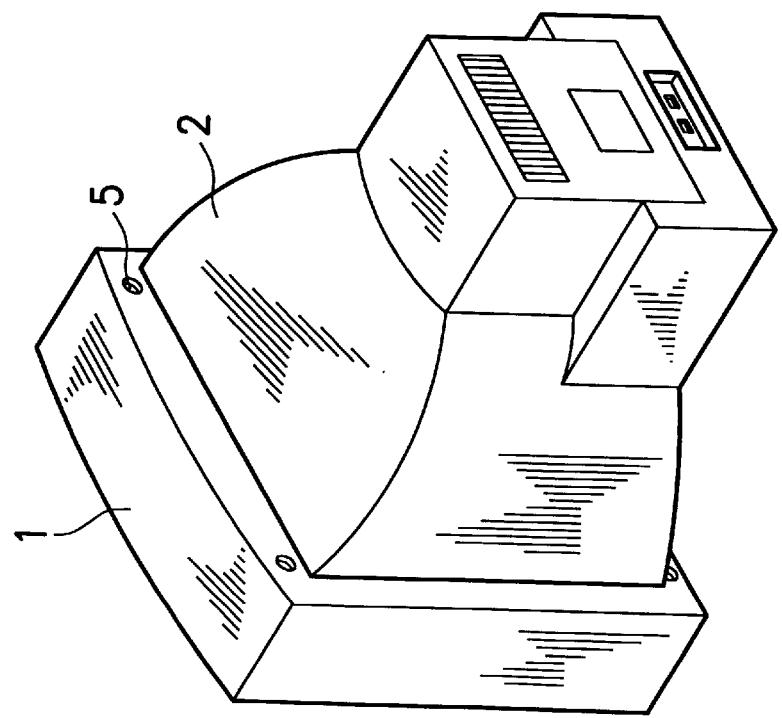
FIG. 1a is a perspective view of a conventional computer monitor wherein the case is mounted onto the front panel by screws.
Figure 2:
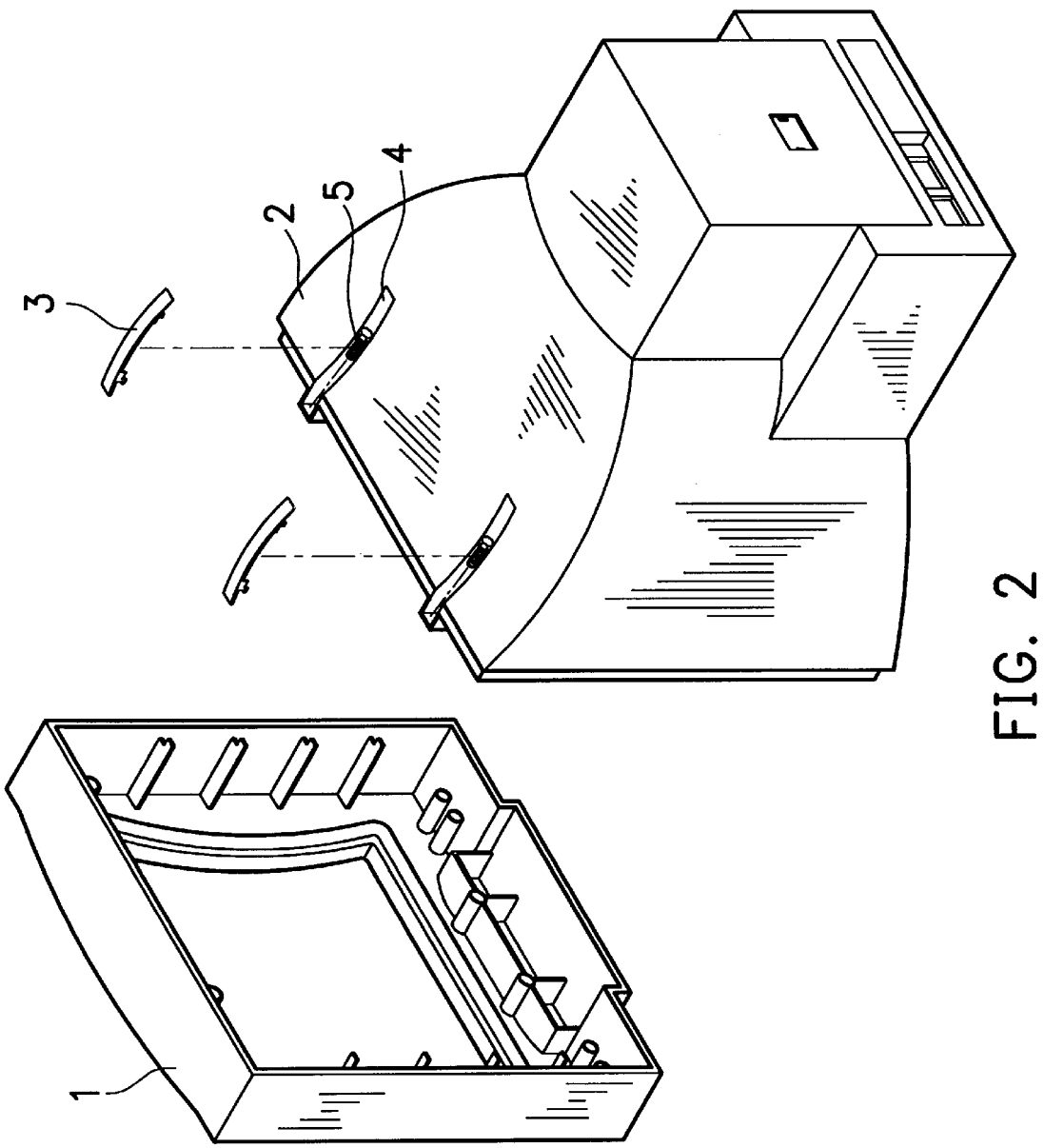
FIG. 2 is an exploded perspective view showing how the cover of the invention covers on the longitudinal recessed portions.
Figure 3:
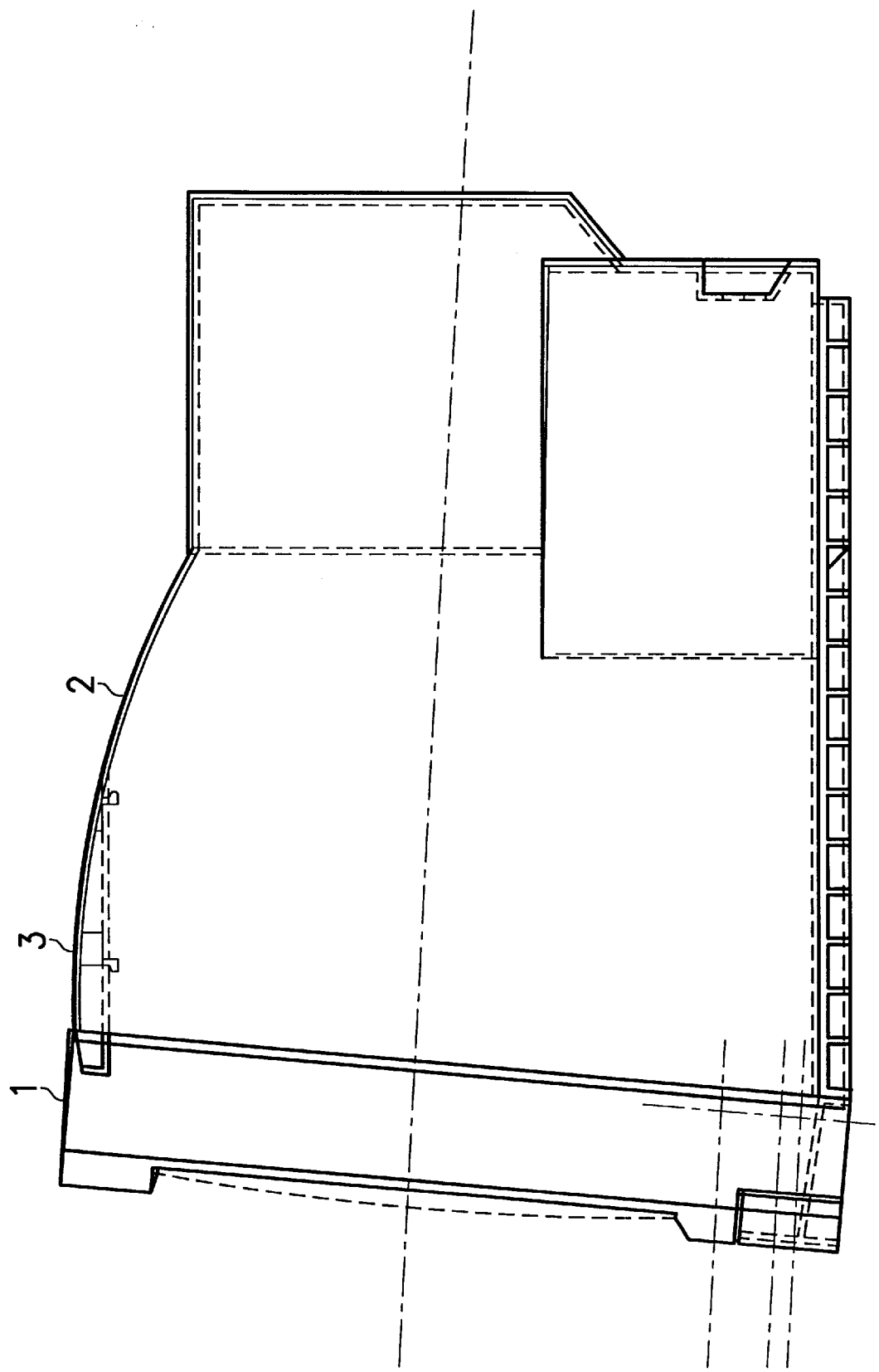
FIG. 3 is a cross-sectional view of the assembled monitor using the cover of the invention.
Figure 4:
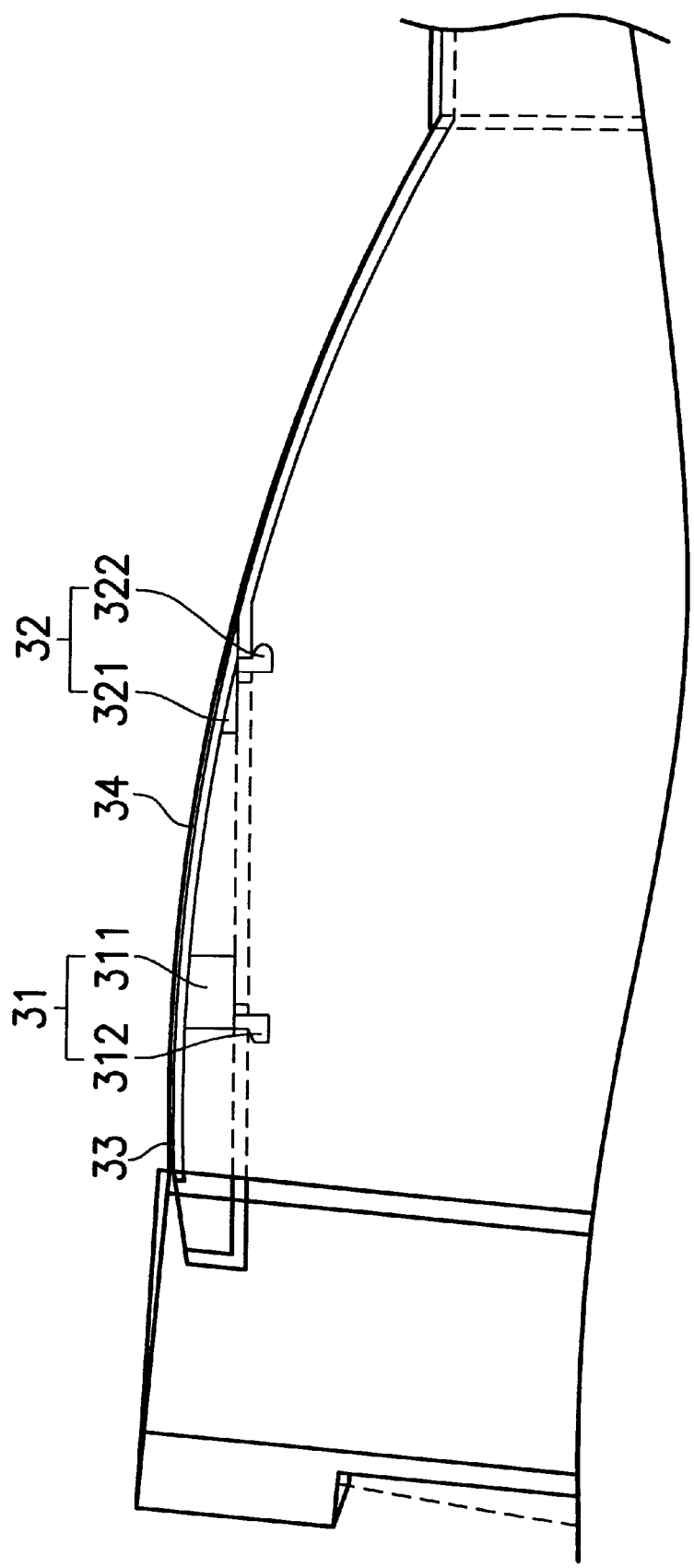
FIG. 4 is an enlarged cross-sectional view showing the cover of the invention covering on the longitudinal recessed portion.

Referring to FIG. 2, two recessed portions 4, 4 are formed in the case 2 to hide the screws 5, 5. The two screws 5, 5 are used to mount the case 2 to the front panel 1. Two cover strips 3, 3 of the invention cover the two longitudinal recessed portions 4, 4. The assembled monitor has a smooth case surface, as can be seen in FIG. 3 and FIG. 4.

Figure 5:
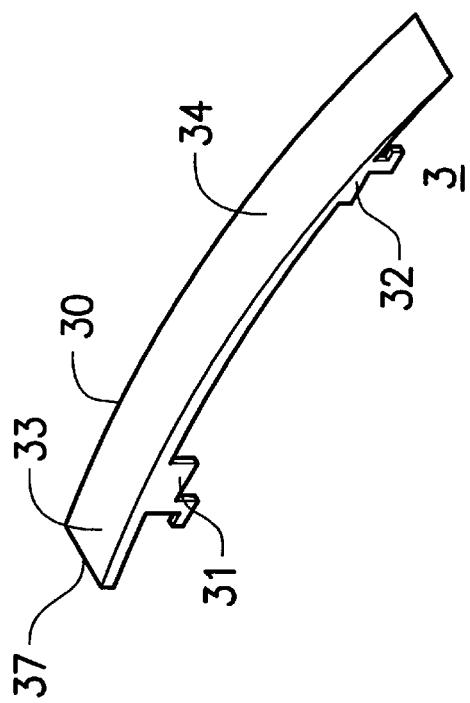
FIG. 5 is a perspective view of the cover of the invention.

Referring now to FIG. 5, the cover 3 of the invention includes a cover strip 30, a first engaging protrusion 31 and a second engaging protrusion 32. The cover strip 30 includes a pressing-down section 33 formed between the first end 37 and the first engaging protrusion 31 and a bouncing-up section 34 formed between the first engaging protrusion 31 and the second engaging protrusion 32. Note that the cover strip 30 is curved in its longitudinal axis direction and is made of resilient material, such as plastic. For example, the cover 3 can be made from ABS (Acrylonitrile-Butadiene-Styrene) resins by injection molding so that the cover strip 30, the first engaging protrusion 31 and the second engaging protrusion 32 are integrally formed.

Figure 6B:
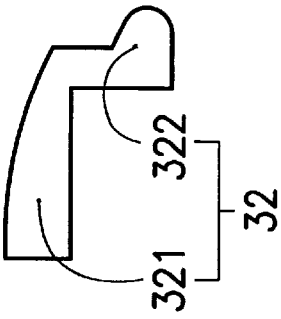
FIG. 6b is a schematic view depicting the structure of the second engaging means of the cover of the invention.
Figure 6A:
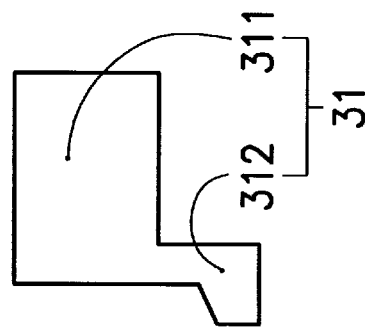
FIG. 6a is a schematic view depicting the structure of the first engaging means of the cover of the invention.

Referring to FIG. 6a and FIG. 6b, the first engaging protrusion 31 includes an engaging seat 311 and a protrusion 312, and the second engaging protrusion 32 also includes an engaging seat 321 and a protrusion 322. Note that the protrusion 312 is disposed toward the front end 37 of the cover strip 30 while the protrusion 322 is disposed in an opposite direction and the protrusion 322 has a round shape.

Figure 7:
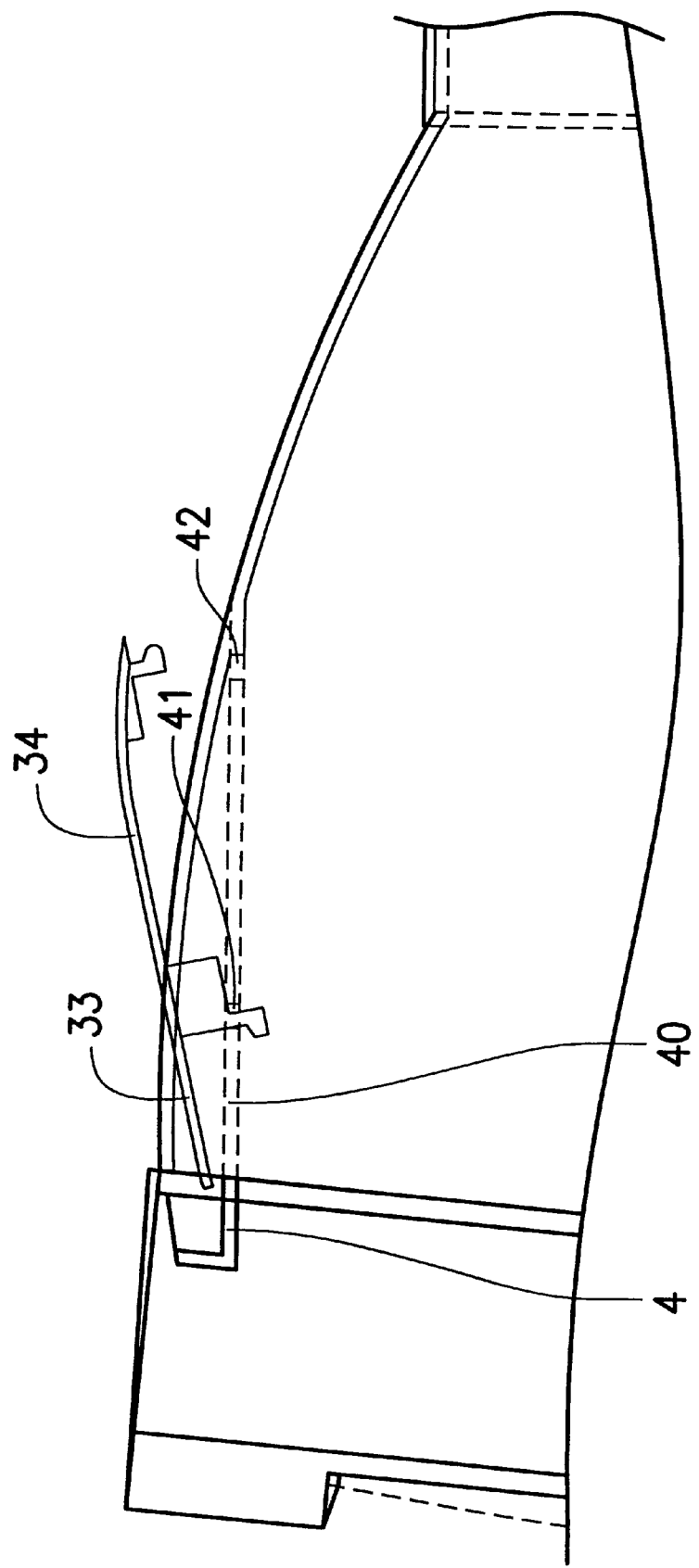
FIG. 7 is a cross-sectional view depicting the cover of the invention in the opened position.

Referring to FIG. 7, at the bottom 40 of the recessed portion 4 two corresponding apertures 41, 42 are formed along the longitudinal axis direction thereof for respectively receiving the first protrusion 312 and the second protrusion 322.

When the cover 3 is to be mounted on the recessed portion 4, the only operations are inserting the protrusion 312 into the aperture 41, inserting the protrusion 322 into the aperture 42, and then pressing down the cover 3.

When the cover 3 is to be detached from the upper case 3, press down on the section 33, then first the protrusion 322 will be forced to jump out of the aperture 42 by the lever principle using the protrusion 312 as a pivot and the resilience of the bouncing-up section 34. Then the protrusion 312 will also be disengaged from the first aperture 41. The round shape of the protrusion 322 can facilitate the disengaging of the protrusion 322 from the aperture 42.

Having the structure as described above, the cover 3 can easily and firmly cover the recessed portion 4, and be easily detached from the upper case 3.

What is claimed is:

1. A monitor comprising:

a case having a recessed portion including a first aperture and a second aperture;

a front panel mounted on said case; and a cover monolithic including a cover plate for covering the recessed portion, said cover having a first end and a second end;

a first engaging means for engaging with the first aperture, said first engaging means being disposed on said cover and adjacent to said first end, the first engaging means including a fulcrum portion;

a second engaging means for engaging with the second aperture, said second engaging means being disposed on said cover adjacent to said second end;

wherein a pressing-down section is provided between said first engaging means and the first end, and a bouncing-up section made of a resilient material is provided between said first engaging means and said second engaging means such that when the pressing-down section is pressed down, the cover rocks about the fulcrum portion so that the resilient bouncing up section flexes to allow said second engaging means to disengage from the second aperture, and then said first engaging means is disengageable from the first aperture.

2. The monitor as claimed in claim 1, wherein said first engaging means comprises a first protrusion thereon protruding toward the first end, for being inserted into the first aperture; and said second engaging means comprises a second protrusion thereon protruding toward the second end, for being inserted into the second aperture.

3. The monitor as claimed in claim 2, wherein said second protrusion has a round shape.

4. The monitor as claimed in claim 1, wherein said resilient material is plastic.

5. The monitor as claimed in claim 4, wherein said resilient material is an ABS resin.

6. The monitor as claimed in claim 1, wherein said cover plate, said first engaging means and said engaging means are integrally formed of plastic by injection molding.

7. The monitor as claimed in claim 1, wherein said cover plate is a cover strip and is curved along a longitudinal axis direction thereof.

\* \* \* \* \*